(12) United States Patent
　　Subramanian

(10) Patent No.: US 12,573,418 B1
(45) Date of Patent: Mar. 10, 2026

(54) AUDIO BUFFER OPTIMIZATION

(71) Applicant: Krishnamurthy Subramanian,
　　　　　　Saratoga, CA (US)

(72) Inventor: Krishnamurthy Subramanian,
　　　　　　Saratoga, CA (US)

( * ) Notice: Subject to any disclaimer, the term of this
　　　　　patent is extended or adjusted under 35
　　　　　U.S.C. 154(b) by 202 days.

(21) Appl. No.: 18/385,227

(22) Filed: Oct. 30, 2023

Related U.S. Application Data

(60) Provisional application No. 63/420,794, filed on Oct.
31, 2022.

(51) Int. Cl.
　　*G10L 25/84* 　　(2013.01)
　　*G10L 15/08* 　　(2006.01)
　　*G10L 25/78* 　　(2013.01)
(52) U.S. Cl.
　　CPC .............. *G10L 25/84* (2013.01); *G10L 15/08*
　　　　(2013.01); *G10L 2015/088* (2013.01); *G10L*
　　　　　　　　　　　　*2025/783* (2013.01)
(58) Field of Classification Search
　　CPC ... G10L 25/84; G10L 15/08; G10L 2015/088;
　　　　　　　　　　　　　　　G10L 2025/783
　　See application file for complete search history.

(56) References Cited

U.S. PATENT DOCUMENTS

2016/0283841 A1 * 　9/2016 　Sainath .................. G06N 3/045
2020/0074997 A1 * 　3/2020 　Jankowski, Jr. ....... G06N 3/045
2021/0090578 A1 * 　3/2021 　Trapp ..................... G10L 17/24
2022/0020361 A1 * 　1/2022 　Wintrode ............... G06N 3/045
2022/0406298 A1 * 12/2022 　Guarneri ............... G06N 3/045
2023/0238014 A1 * 　7/2023 　Gosson .................. H03H 11/04
　　　　　　　　　　　　　　　　　　　　704/257
2025/0149036 A1 * 　5/2025 　Fidler ..................... G10L 15/02

* cited by examiner

*Primary Examiner* — Fariba Sirjani
(74) *Attorney, Agent, or Firm* — Robert Schuler

(57) ABSTRACT

A voice-controlled device, such as a virtual assistant, has
keyword processing functionality 200 that operates to iden-
tify voice activity in environmental sound information, and
to then process the environmental sound information when
voice activity is detected to extract one or more audio
features and can be used by a neural network to identify one
or more keywords. The keyword processing functionality is
controlled to not process or to store any sound information
prior to voice activity being detected.

6 Claims, 7 Drawing Sheets

KEYWORD PROCESSING 210

Figure 2:
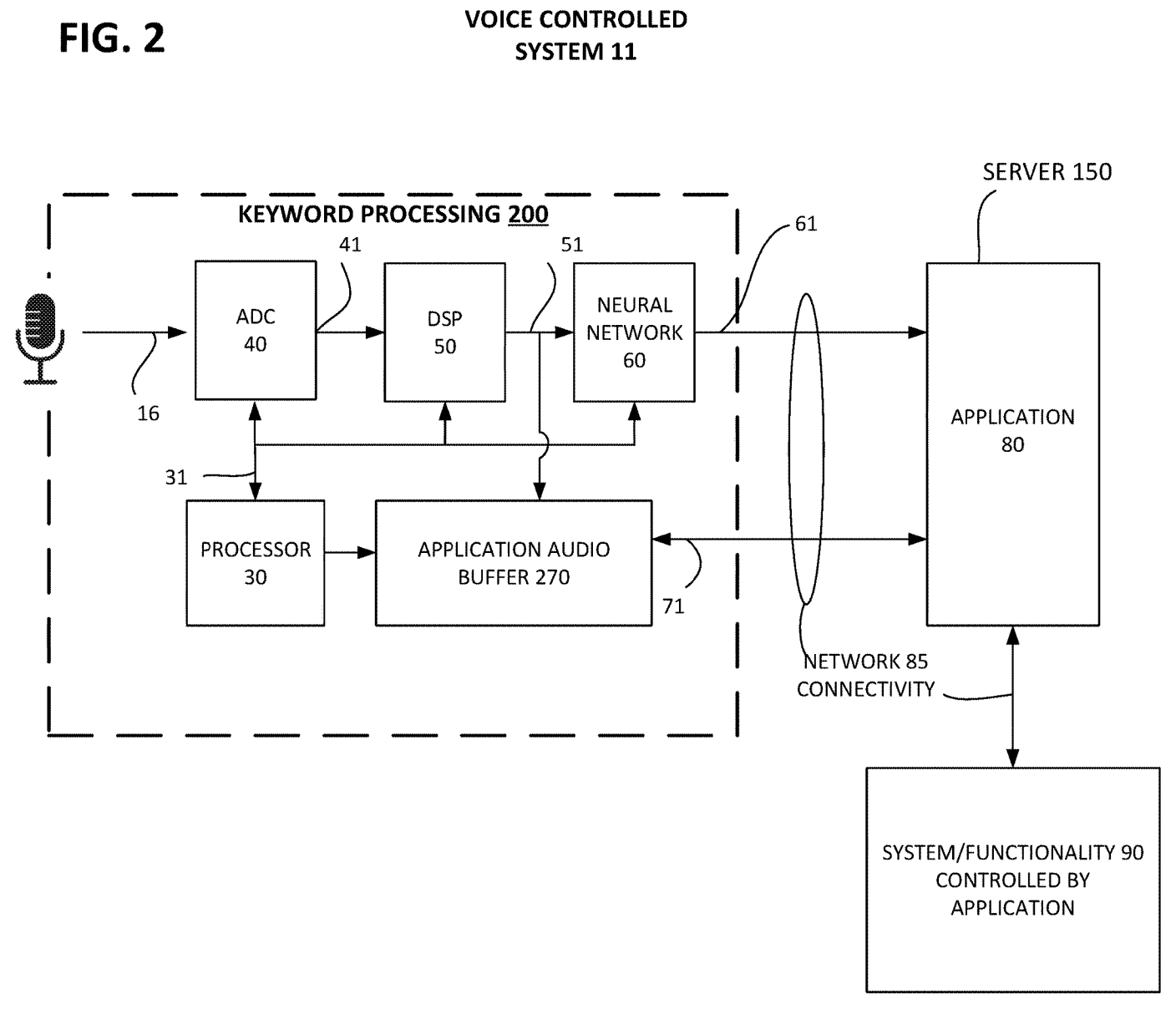

VOICE CONTROLLED SYSTEM 11

KEYWORD PROCESSING 200

ADC
40

DSP
50

NEURAL NETWORK
60

PROCESSOR
30

APPLICATION AUDIO BUFFER 270

NETWORK 85 CONNECTIVITY

SERVER 150

APPLICATION
80

SYSTEM/FUNCTIONALITY 90 CONTROLLED BY APPLICATION

16

41

51

61

71

31

VOICE ACTIVITY DETECTOR 20

AUDIO BUFFER OPTIMIZATION

1. FIELD OF THE INVENTION

The present disclosure relates generally to voice controlled devices and systems, and more specifically to key-
word processing functionality that is controlled to operate on
sound information that comprises voice activity.

2. BACKGROUND

Once powered on, functionality comprising a voice-con-
trolled (VC) System can receive wakeword/keywords from
a user that cause it to control the operation of a household
or commercial system, such as lighting, heat, or security,
watch, smart glass. Such a VC System typically continually
monitors and processes all sound information, using a
microphone, emanating from the environment in which it is
operating, in order to identify wakeword/key words used to
generate instructions to control the household system. In
order to identify wakeword/keywords, the VC System typi-
cally processes all of the sound information, in a continuous
stream of sound information, it receives from the environ-
ment in which it is operating. The VC System extracts audio
features from the sound that can be used by speech recognition functionality to identify parts of speech (i.e., words or
phrases). For example, the VC System can process a stream
of sound information looking for a word that instructs the
System to "Wake-Up" or "Activate Security". Consequently,
it is optimal that the voice-controlled system described
above is configured to process all the sound information in
the environment in which it operates in order to identify all
of the key words it uses to generate control instructions. This
VC System must be implemented with processing function-
ality and bandwidth that enables it to receive and process all
the sound information it receives from the environment in
real-time (i.e., minimum delay between processing key
words and generating control instructions). Further, the
environmental sound information may need to be stored, at
least temporarily, in appropriately sized memory for a record
of what a user uttered. Still further, all of the processing,
memory and data transmission functionality needed to run
such a VC System occupies a finite amount of space, and as
systems become more mobile or unobtrusive, system space
is at a premium.

3. BRIEF DESCRIPTION OF THE DRAWINGS

FIG. 1 is a diagram showing elements comprising an
embodiment of a voice-controlled virtual assistant system
10.

FIG. 2 is a diagram showing elements comprising key-
word processing functionality 200.

4. DETAILED DESCRIPTION

Figure 3:
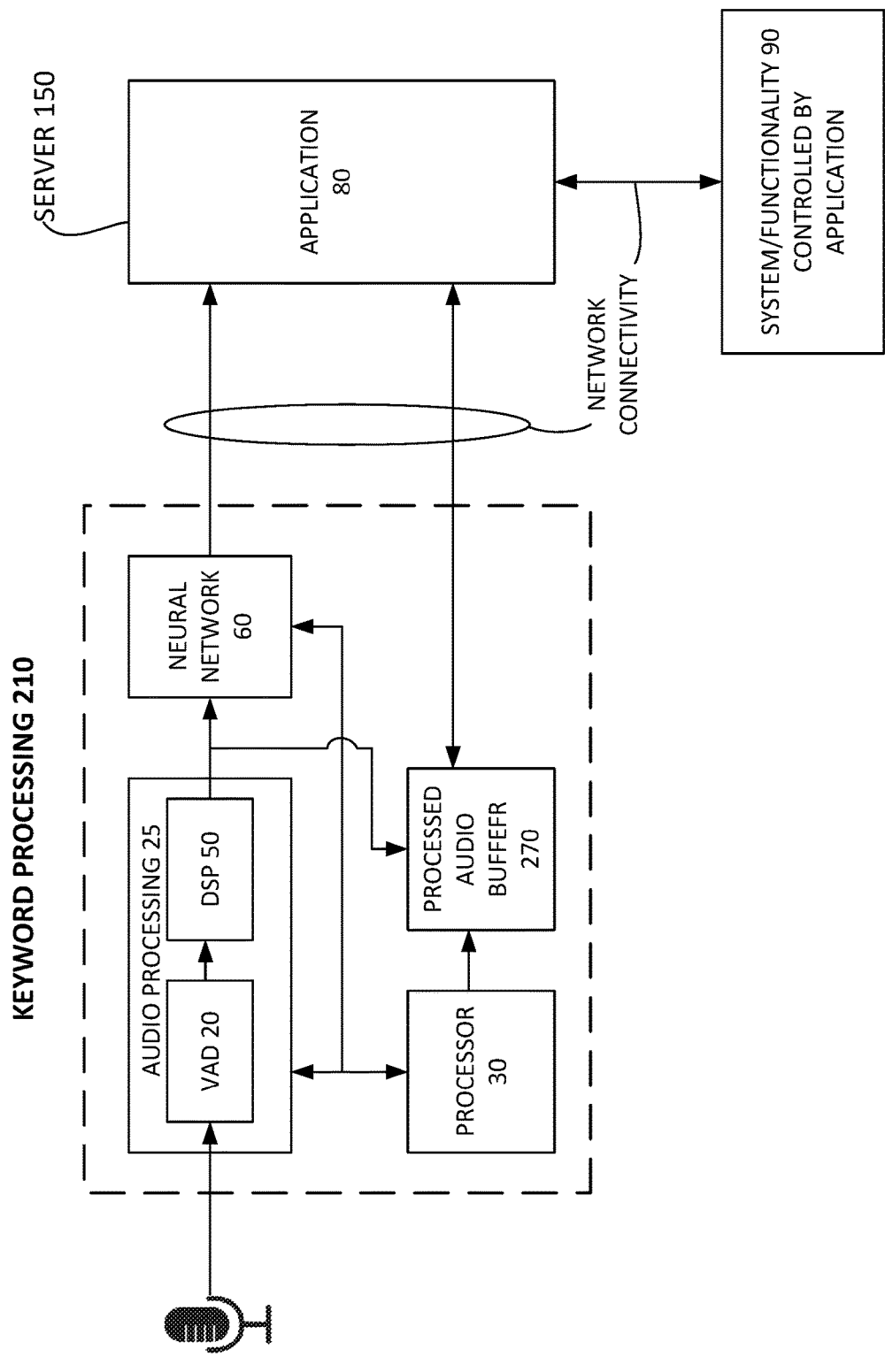
FIG. 3 is a diagram showing elements comprising key-
word processing functionality 300.

In order to mitigate the space and power requirements
needed to implement a VC System, and according to one
embodiment, I have designed a keyword detection method
and system that operates to maintain environmental sound
information received by the VC System in a compressed
format where is available for examination by a computer
application. This keyword detection system operates to
process sound information corresponding to all voice activ-
ity that is received by the system and to detect keyword
information that it can then send to the VC System.

According to another embodiment, the VC System can
access the compressed sound information, decompress it,
and process the decompressed sound information in order to
detect keywords present in this information.

According to another embodiment, the keyword detection
system operates to process sound information received at the
VC System, and to process this sound information to detect
one or more keywords. Any detected keyword information
can then be sent to the computer application running on the
VC System.

According to another embodiment, the application run-
ning on the VC System compares any keywords it detects
with the keyword information sent to it by the keyword
detection system in order to check for accuracy.

According to another embodiment, the keyword detection
system operates under the control of a voice-activity detec-
tor to only process sound that has voice information.

According to another embodiment, the keyword detection
system operates in conjunction with the voice-activity detec-
tor to maintain a portion of all recent sound information
received by the VC System prior to the voice-activity
detector detecting voice information.

Figure 1:
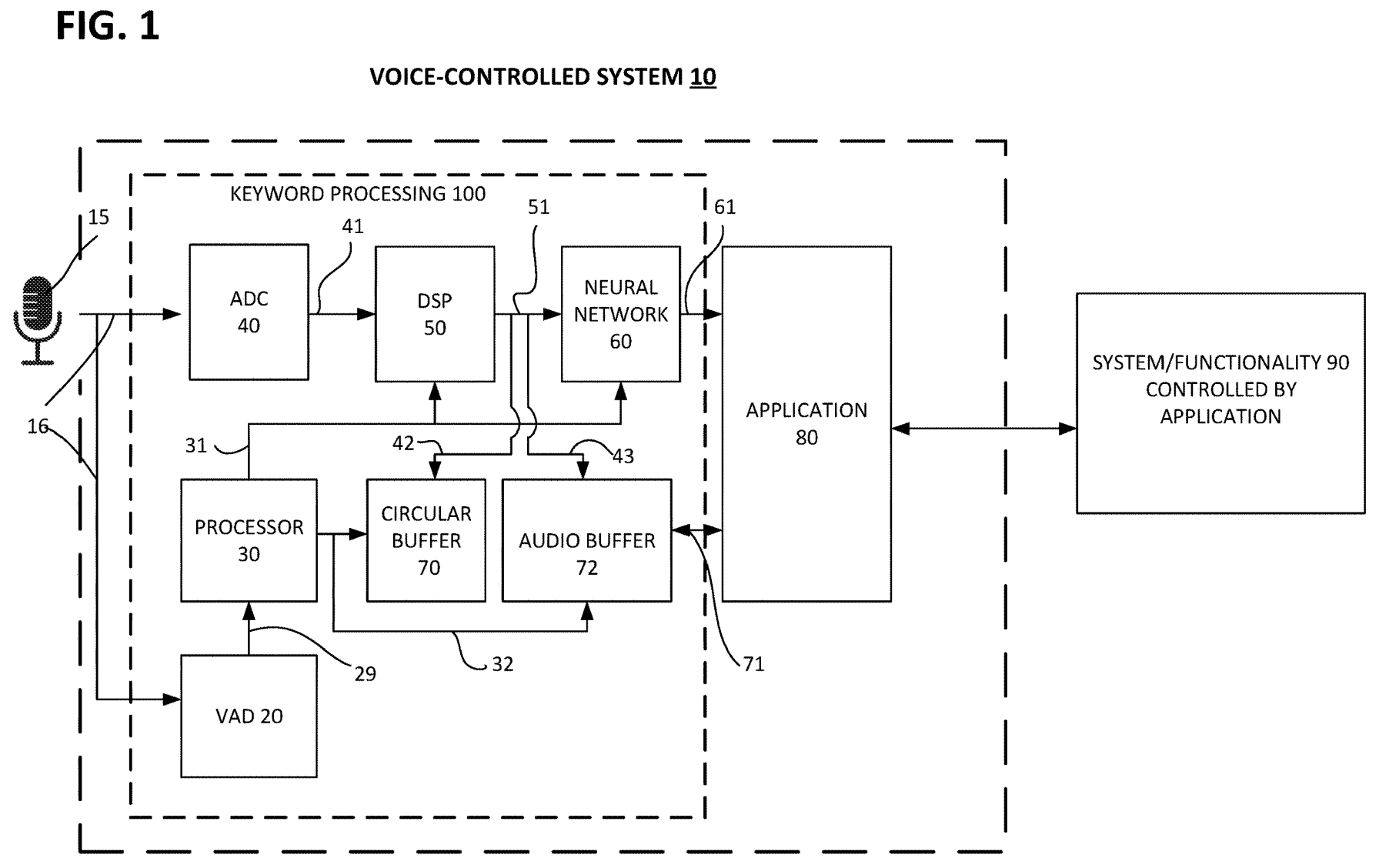

These and other embodiments will now be described with
reference to the Figures, wherein FIG. 1 is an illustration
showing functional blocks comprising a voice-controlled
(VC) system 10. The System 10 has a microphone 15 that
captures sound information from an environment in which
the assistant 10 operates and transmits the sound informa-
tion, in analog form, over a wired or wireless link 16 to a
keyword processing system 100 comprised of a voice-
activity detector (VAD) 20, a processor 30, an analog-to-
digital converter (ADC) 40, a DSP 50, a neural network 60,
and buffers 70 and 72. The VAD 20 operates to identify
voice activity in the sound it receives from the microphone,
and sends a signal over 29 to the processor 30 when voice
activity is detected. Generally, the processor 30 is configured
with logical computer instructions maintained in non-vola-
tile memory that are used to control the operation of the
keyword processing functionality 100. The processor 30
receives the voice activity signal and uses instructions in one
or more registers to control the operation of the DSP 50
neural network 60, and buffers. According to one embodi-
ment, when the System 10 is active, and prior to the VAD
detecting voice-activity, digitized sound information from
the ADC 40 is processed by the DSP 50 to extract audio
features, and the processed sound information is controlled
by the processor 30 to be sent to a circular buffer 70 where
it is maintained for a selected period of time determined by
the size of the buffer. The buffer 70 is designed to only
maintain the most recently processed samples of sound,
which can be for example the last 160 milli-seconds of
sound. As will be described later, the processed sound
information maintained in the buffer 70 with be used by a
neural network 60 to detect keywords. More specifically, the
digitized sound information is transmitted over 41 to the DSP 50 which generally operates to extract audio features from the sound information that the neural network 60 uses to identify keywords. The resulting keyword information can be sent to an application 80, running on any appropriate local or remote compute functionality (not shown), and the keywords are used by the application to generate instructions send over a local or wide-area network 85 system 90 functionality to control some residential or commercial system, such as building locks, security, lighting, heating, or any other system operating inside or outside a building or venue.

Continuing to refer to FIG. 1, a second buffer 72 is controlled by the processor 30 to receive processed sound information subsequent to the VAD 20 detecting voice activity. In operation, a voice-controlled system, such as the System 10, may not be able to capture an initial small amount of sound/voice information uttered by a user. Accordingly, it is important to be able to maintain at least some of the most recent sound information in the buffer 70, for later processing by the neural network 60, whether or not voice activity is detected. Then, if voice activity is detected, at least some of the sound information maintained in the circular buffer 70 is available to the neural network 60 for processing subsequent to voice activity being detected. At a point that voice activity is detected, the processor 30 can control the DSP 5 neural network 60 to access at least some of the sound information in the circular buffer 70 for processing, after which time the neural network can start processing sound received by the VC system. The buffer 70 can be implemented in any appropriate volatile computer memory of an appropriate size.

With further reference to FIG. 1, it should be appreciated that processed audio information maintained in the buffers 70 and 72 is in a condensed format which allows smaller buffers to be used. Also, only the information in buffer 72 can be accessed and processed by the application 80 to ensure that the keyword information it receives from the neural network 60 is accurate.

While the application 80 is shown as being implemented proximate to the microphone 15 and associated signal processing functionality (i.e., 50 and 60) comprising the assistant 10, this does not have to be the case. As shown in FIG. 2, the application can be located in a server that is remote from the signal processing functionality and communicate with it over a network.

FIG. 2 illustrates voice-controlled system 11 having functionality similar to that described with reference to the System 10 in FIG. 1, except this embodiment does not implement a circular buffer, does not have a voice-activity detector, and only maintains processed sound information in an application buffer 270. Also, the application 80 is shown to be located in a server 150 that is remote from keyword processing functionality 200 which is comprised of the functionality needed to identify the keywords. As shown in FIG. 2, the keyword processing 200 is comprised of the microphone 15, processor 30, ADC 40, DSP 50, neural network 60 and the buffer 270. With the exception of the buffer 270, all of these elements perform the same function as described with reference to FIG. 1. However, all of the sound information received by the microphone comprising this system is processed by the DSP 50 and maintained, for at least some period of time, in the buffer 270. As with the buffer 70 in FIG. 1, the buffer 270 only stores audio information in a compressed format, which I this case is a plurality of audio features extracted by the DSP 50. Maintaining compressed audio information permits the use of a much smaller buffer than would otherwise be necessary, which has the benefit of mitigating the size and power requirement of this buffer. Consequently, all of the keyword processing keyword processing functionality 200 can be implemented in the microphone 15.

In accordance with the embodiment described with reference to FIG. 2, The application 80 is configured to be able to access the audio compressed information maintained in the buffer 270, and so should be implemented with functionality that permits it to de-compress the buffered information, extract audio features from the de-compressed audio information, and to detect keyword information (with neural network functionality similar to that in the keyword processing 200 The functionality needed by the application to perform these operations is well known to those whose are stilled in the art, and so will not be described here is any detail.

The processed audio information maintained in the buffer 270 can be in any one of a plurality of formats, to include but not limited to Frequency Spectrogram, Log Energy or Log Power Spectrogram, Log Mel Energy Spectrogram, Log Mel Power Spectrogram or MFCC (Mel-Frequency Cepstral Coefficients).

FIG. 3 illustrates another embodiment of the keyword processing functionality described with reference to FIG. 2. Keyword processing functionality 210 has the same functional elements as that described in FIG. 2, with the exception that the output of the microphone is sent directly to an audio processing functionality 25 that has a voice-activity detector (VAD) 20. According to this embodiment, the DSP 50 is controlled to extract features from sound information in an analog format, as opposed to the digital format described in FIG. 2. This DPS functionality is implemented in a device (aMFCC.01-TSMC-22-ULL) that commercially available from Dolphin-Design. Implemented in this manner, only audio features extracted by the DSP are maintained in the buffer where they can be accessed by the application 80 for examination if needed, resulting in a small memory requirement. Further, only sound information having voice activity is processed and maintained in the buffer 270.

Figure 4:
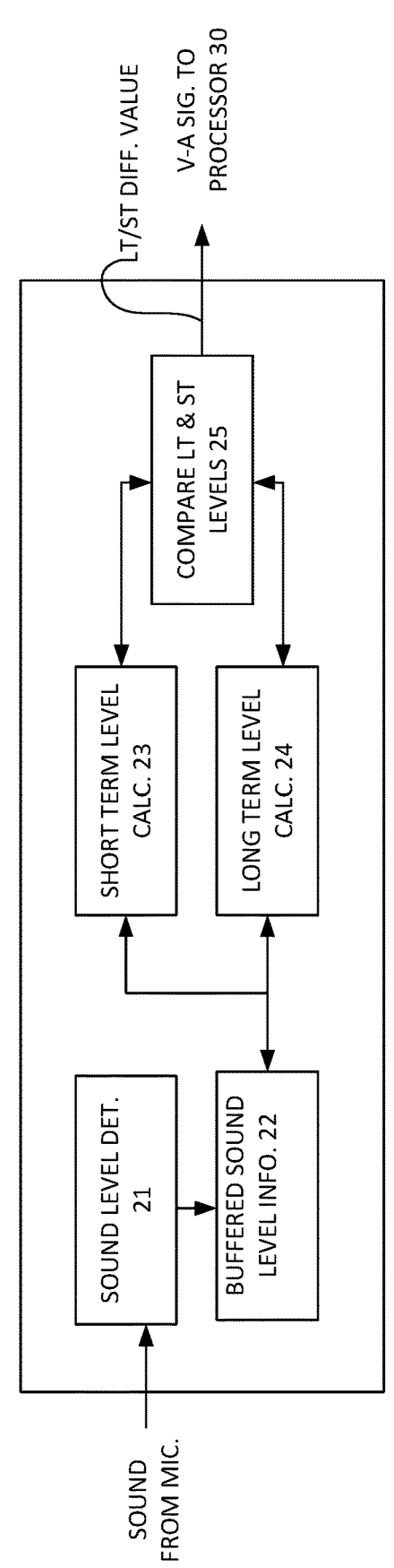
FIG. 4 is a diagram showing functional blocks comprising
a voice activity detector.

FIG. 4 is a diagram showing functional blocks comprising the VAD 20 described earlier with reference to at least FIG. 1. The VAD generally operates to detect voice activity in a stream of analog sound information received from the microphone 15 and is comprised of a sound-level detector 21, memory 22 to maintain the sound level values (per sample) observed by the detector 21, short-term (ST) 23 and long-term (LT) 24 sound level calculation functionality, and functionality to compare a short-term sound level to a long-term sound level. The duration of time and the frequency range or ranges over which the short-term and/or long-term sound level value are calculated can be selected, and the detector 21 can measure sound power levels in decibels, for example. The output of the long-term to short-term sound level comparison by the functionality 25 is sent to, or accessed by, the processor 30. The processor 30 is configured to maintain a sound level threshold value, and the processor can generate a signal to activate the element comprising the keywork processing functionality if the difference between the short and long-term sound level exceeds this threshold value. The duration over which the VAD measures sound levels, and the threshold value maintained by the VAD can be determined at empirically.

Figures 5, 6:
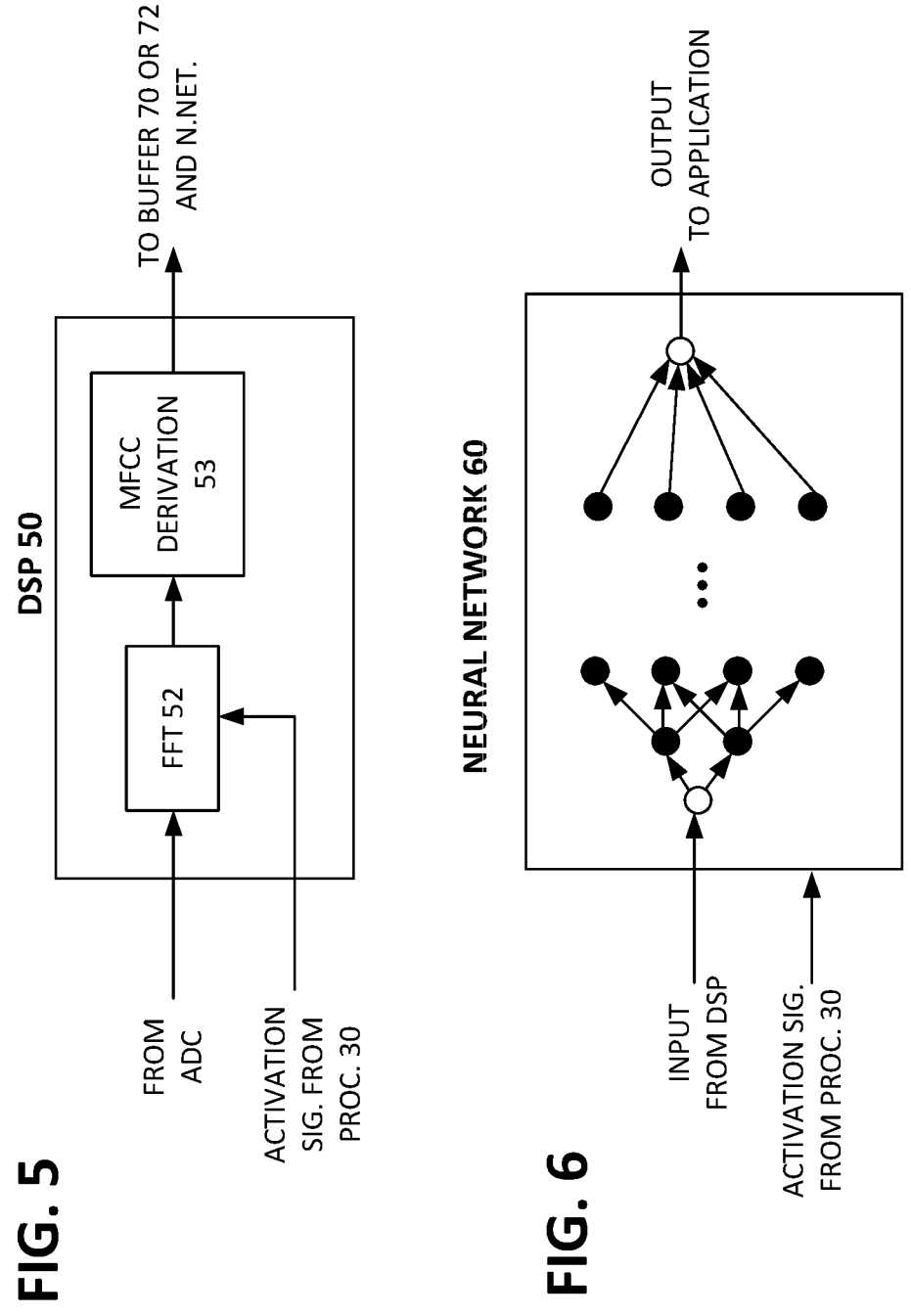
FIG. 5 is a diagram showing functional blocks comprising
a DSP 50 configured to extract audio features.
FIG. 6 is a diagram showing an exemplary neural network 60
60.

With reference to FIG. 5, the DSP 50 described earlier generally operates to examine digital audio information, it receives from the ADC 40, to derive audio features that can be used to identify keywords recognized by the application 80 to control some residential or commercial system functionality. One such audio feature is a Mel-frequency cepstral coefficient (MFCC). Specifically, the DSP 50 is comprised of an FFT 52 and functionality 53 that operates on the output of the FFT to derive one or more Mel-frequency cepstral coefficients (MFCCs). The process by which an MFCC is derived will not be described here, as this derivation process is well known to audio engineers. Further, it should be understood, that while this embodiment operates using an MFCC type audio feature, other audio features (i.e., Log energy, Log power spectrum, Log Mel energy spectrogram, or Log Mel power spectrogram) can also be used. In operation, the MFCCs derived by the DSP 50 are available as the input to the neural network 60.

FIG. 6 is an illustration of a neural network, such as the neural network (NN) 60 described earlier. The NN 60 shown with reference to FIG. 6 is for illustrative purposes only, and is not meant to be limiting, as the number of nodes and layers (input, hidden and output), and the interconnection between the nodes can be greater or lesser than that which are illustrated in FIG. 6. Generally, a neural network is trained to identify something, such as an image, words/sounds, objects within an image, etc., and different information can be utilized to train such networks. According to one embodiment, the NN 60 can be trained using one or more MFCCs, each one of which can reference a keyword used to control the operation of the application 80. One keyword the NN 60 can be trained to identify is a wake word, such as "Hi Google", "Alexa", "application wake-up". Other keywords can be for example "turn on lights", "unlock front door", or "turn on heat". In operation, the one or more MFCCs derived by the DSP 50 serve as the inputs to the NN 60, and the MFCC information is propagated through the NN to the output node. If a value of an output node is greater than some selected output value for that node, then the application 80 can determine that a keyword has be identified and proceed to use that work to control the operation of some functionality, such as lighting, heating or security.

Figure 7A:
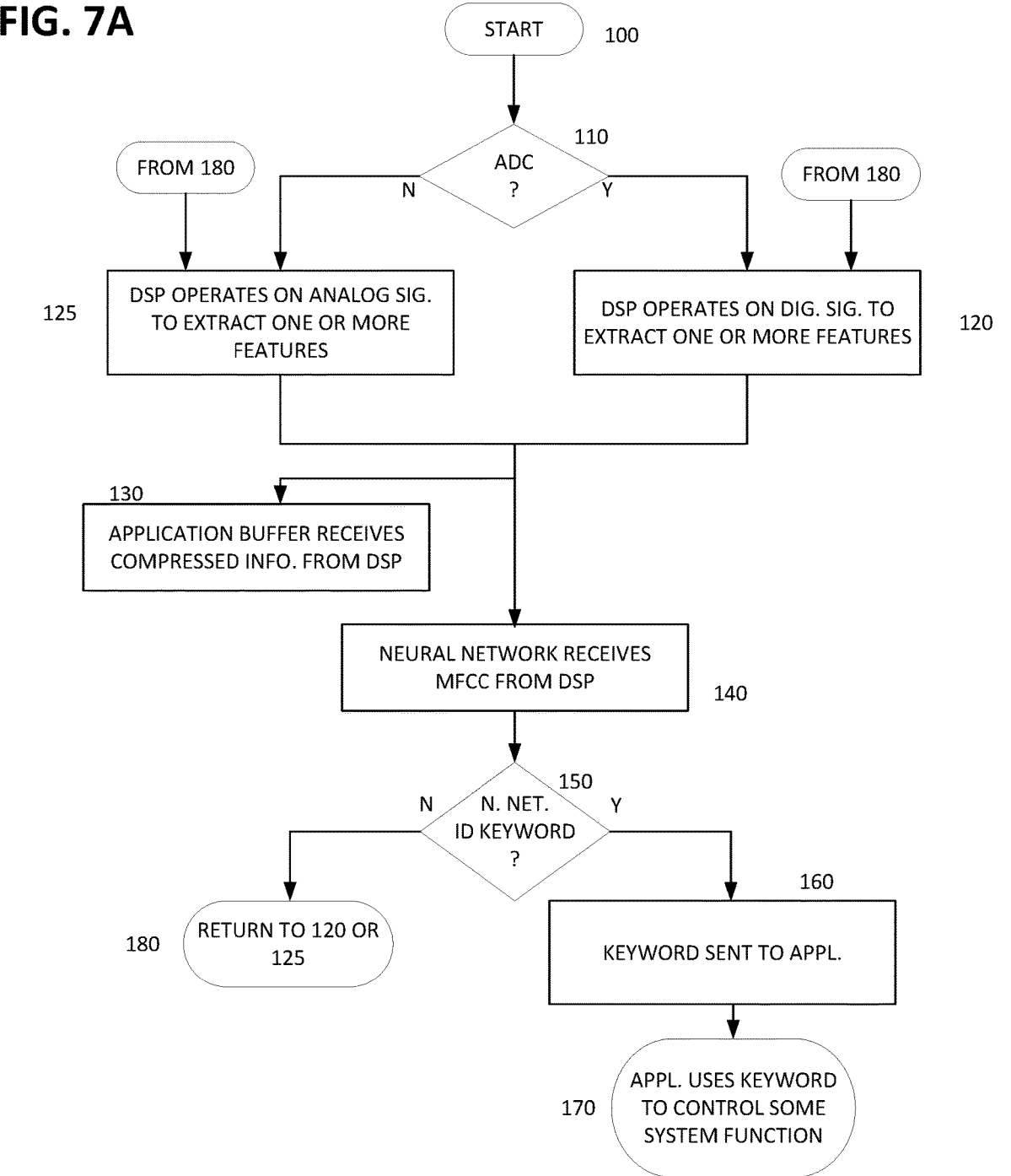
FIG. 7A is a diagram illustrating one embodiment of a
logical process that the VC System can follow to process
environmental sound information.

FIG. 7A is a diagram illustrating a logical process by which the keyword processing functionality 200 described with reference to FIG. 2 operates to identify keywords. At 100, once the voice-controlled system 11 is powered-on, the microphone starts receiving sound information from the environment in which the system is operating. In the case that the system has an ADC, this sound information at 110 is converted to a digital format, else the sound information in analog form, is sent at 120 or 125 respectively to the DSP 50 which extracts features from the sound information.

the DSP 50 operates on the analog or digitized sound information to derive one or more audio features, such as for example, one or more Mel-frequency cepstral coefficients. More specifically, the FFT 52 comprising the DSP transforms the sound information into frequency domain information, that is used by the functionality 53 to derive one or more MFCCs.

With continued reference to FIG. 7A, once a MFCC has been derived, it can be stored in the buffer 270 at 130 and at 140 is made available as an input to the NN 60, which operates on the MFCC information to identify one or more keywords. Then, at 150, if the value at any particular output of the NN indicates that a keyword has been identified, the process proceeds to 160, else at 180 the process returns to 120 or 125 if a keyword is not recognized. During the time that the NN 60 is operating on MFCC information, the processor 30 is examining the output(s) to the NN and evaluating whether any output value is indicative that the NN has identified a keyword or not. If, as described above, a keyword is detected, then the process proceeds to 170 and the NN 60 is controlled to send the keyword information to the application 80 which, and the application can use the keyword to control some system functionality, such as activating a security system. On the other hand, it a keyword is not detected at 150, then the process returns to 120 or 125

Figure 7B:
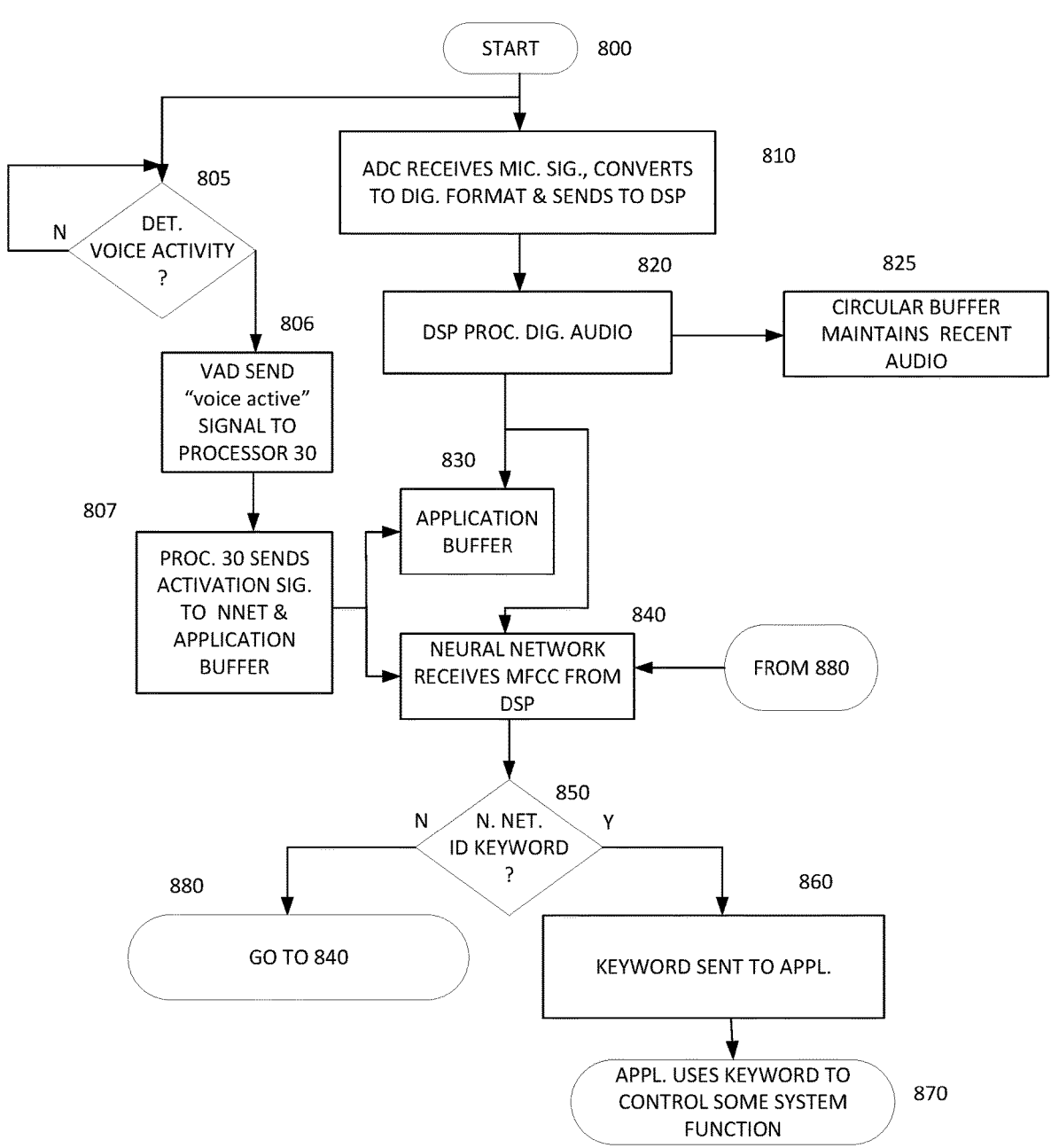
FIG. 7B is a diagram illustrating another embodiment of
a logical process that the VC System can follow to process
environmental sound information.

Referring now to FIG. 7B, which is a diagram illustrating a logical process by which the processing functionality 100 of FIG. 1 operates to identify keywords. The logical process in FIG. 7B is similar to that described with reference to FIG. 7A, but has the circular buffer 70 described earlier with reference to FIG. 1 that operates to receive and maintain a programmable amount of the most recently received processed audio information from the DSP 50.

After the system 10 becomes active at 800, the VAD starts operating to detect voice activity, and at the same time at 810, the ADC starts converting the microphone signal to a digital signal (assuming ADC is present) and sending this signal to the DSP 50. At 820 the DSP processing the digitized sound signal received from the ADC to extract audio features that are representative of keywords of interest, and sends the extracted feature information to the circular buffer 70, where at 825 an amount of the most recent feature information is maintained, Then, if at 805 voice activity is detected, the VAD at 806 sends a signal to the processor 30 that voice activity has been detected, and at 807 the processor activates the application buffer and the neural network. At 830 the application buffer starts to store the audio feature information generated by the DSP, and at 840 the neural network starts processing the feature information from the DSP to determine whether it includes keywork information. If at 850 the neural network detects keyword information, then the process proceeds to 860 and keyword information can be sent to the application 80, otherwise the process can return to 840.

Operating in this manner, the System 10 can ensure that all of the audio information necessary to accurately identify keywords has been processed, and the computer application 80 has access to enough information in the buffer 72 with which to determine the accuracy of the keyword information it receives from the keywork processing 100.

The forgoing description, for purposes of explanation, uses specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method for identifying a keyword used to operate a voice-controlled system, the method comprising:

receiving a stream of environmental sounds;

sampling the stream of environmental sounds to generate a first plurality of samples;

extracting one or more first audio features from the first plurality of samples;

storing the first audio features in a first computer memory, wherein the first computer memory is a circular buffer;

detecting, by a voice activity detector, voice activity in the stream of environmental sound subsequent to storing the first audio features;

sampling the steam of environmental sounds, subsequent to detecting the voice activity, to generate a second plurality of samples;

extracting one or more audio features from the second plurality of samples;

identifying, using a trained neural network, a keyword by processing the stored first audio features in conjunction with the extracted second audio features; and sending the identified keyword to a computer application using the voice-controlled system to control a function of the voice-controlled system;

wherein the keyword is not identifiable from the second audio features alone, and wherein the processing relies on the first audio features stored in the first memory.

2. The method of claim 1, wherein the environmental sound information is compressed by extracting audio feature information.

3. The method of claim 1, wherein the extracted audio feature information is maintained in a computer memory that is accessible by the voice-controlled system.

4. The method of claim 1, wherein the extracted audio feature is comprised of a Mel-frequency cepstral coefficient, Log energy, Log power spectrum, Log Mel energy spectrum or Log Mel power spectrum.

5. The method of claim 1, wherein the stream of environmental sound comprises a voice command uttered by a user of the voice-controlled system.

6. The method of claim 1, wherein the compressed sound information comprises an audio feature extracted by a digital signal processor under control by the keyword processing system.

* * * * *